US011982470B2

(12) United States Patent
Hadash

(10) Patent No.: US 11,982,470 B2
(45) Date of Patent: May 14, 2024

(54) METHOD AND DEVICE FOR SUPPLYING COOL FLUID

(71) Applicant: INHALETECH LLC., Minneapolis, MN (US)

(72) Inventor: Joseph Hadash, Lapid (IL)

(73) Assignee: INHALETECH LLC., Minneapolis, MN (US)

( * ) Notice: Subject to any disclaimer, the term of this patent is extended or adjusted under 35 U.S.C. 154(b) by 0 days.

(21) Appl. No.: 17/530,582

(22) Filed: Nov. 19, 2021

(65) Prior Publication Data

US 2022/0146153 A1 May 12, 2022

Related U.S. Application Data

(63) Continuation-in-part of application No. PCT/IL2019/050577, filed on May 22, 2019.

(51) Int. Cl.

*F25B 19/00* (2006.01)
*A61J 1/16* (2023.01)
*F25D 3/10* (2006.01)
*F25D 3/12* (2006.01)

(52) U.S. Cl.

CPC ............ *F25B 19/005* (2013.01); *A61J 1/165* (2013.01); *F25D 3/10* (2013.01); *F25D 3/12* (2013.01)

(58) Field of Classification Search

CPC .......... F25B 19/005; A61J 1/165; F25D 3/10; F25D 3/12; F25D 2317/0411; F24F 2003/144

See application file for complete search history.

(56) References Cited

U.S. PATENT DOCUMENTS 3,385,073 A * 5/1968 Snelling .................. F25D 3/105 62/239
3,642,059 A 2/1972 Greiner
4,096,707 A * 6/1978 Taylor ...................... F25B 19/00 62/387
4,235,608 A * 11/1980 Watanabe ............ F24F 3/1423 96/123
4,373,344 A * 2/1983 Hinn ......................... F25D 3/12 62/62
5,950,442 A * 9/1999 Maeda .................... F24F 5/001 62/332

(Continued)

FOREIGN PATENT DOCUMENTS

CZ 2008786 6/2010
DE 29716515 U1 11/1997

(Continued)

OTHER PUBLICATIONS

Al Sayed et al "Experimental investigation of the cooling capacity of gaseous carbon dioxide in free jet expansion for use in portable air-cooling systems", Open Journal of Applied Sciences Feb. 14, 2018.

(Continued)

*Primary Examiner* — David J Teitelbaum
(74) *Attorney, Agent, or Firm* — Dority & Manning, P.A.

(57) ABSTRACT

The invention provides a compact and self-sustained refrigeration system for medical uses, including in hospitals, in clinics and in home uses, including rescue and field emergency situations, independent of external power supply, based on small amounts of liquid carbon dioxide.

18 Claims, 3 Drawing Sheets

(56) References Cited

U.S. PATENT DOCUMENTS

| | | | |
|---|---|---|---|
| 6,761,042 B1 | 7/2004 | Sabin | |
| 9,976,782 B1 * | 5/2018 | Holzwanger | F25B 43/003 |
| 2007/0055325 A1 | 3/2007 | Worm | |
| 2018/0266734 A1 | 9/2018 | Holzwanger et al. | |
| 2019/0041005 A1 | 2/2019 | Martin et al. | |
| 2020/0124336 A1 * | 4/2020 | Moon | F25D 3/105 |
| 2020/0191448 A1 * | 6/2020 | Ellis | B01D 11/0292 |

FOREIGN PATENT DOCUMENTS

| | | |
|---|---|---|
| EP | 1621829 A1 | 2/2006 |
| WO | WO2004089823 A1 | 10/2004 |

OTHER PUBLICATIONS

Evaluation of CO2 supermarket refrigeration systems, MSC thesis Sarah Johansson, Dec. 31, 2009.
International Search Report and Written Opinion of PCT/IL2019/050577 dated Sep. 2, 2019, 13 pages.
Extended European Search Report for corresponding Application No. EP 19929435.6, dated Feb. 24, 2023, 13 pages.
Partial Supplementary European Search Report for corresponding Application No. EP 19929435.6, dated Nov. 22, 2022, 15 pages.

* cited by examiner

METHOD AND DEVICE FOR SUPPLYING COOL FLUID

CROSS REFERENCE TO RELATED APPLICATIONS

This application is a Continuation of International Application Number PCT/IL2019/050577 filed under the Patent Cooperation Treaty having a filing date of May 22, 2019, which is incorporated herein by reference.

FIELD OF THE INVENTION

The present invention relates to a closed, compact, and self-sustained refrigeration system for cooling relatively small volumes or areas, or for producing relatively small streams of cooled fluid. Particularly, the invention provides a compact cooling device for medical and clinical uses, in hospitals, in clinics and in home use, including for autonomous field-uses without external power supply.

BACKGROUND OF THE INVENTION

Medical and biological research and practice cannot do without huge cooling and freezing rooms and systems, but also relatively small cooling or freezing devices are still more needed in medicine. A number of clinical procedures require cooling, and cooling is needed in transport and storage of organs and tissues for transplanting. Some situations require quick cooling of small samples, tissues, or organs, and other situations require prolonged cooling outside buildings and facilities, for example in transportation of dead bodies. Sometimes, instruments or parts thereof must be quickly cooled to very low temperatures, and some situations request mild cooling of relatively small spaces. A relatively weak stream of very cold air may save patients afflicted with brain stroke or other damage before they are evacuated to a hospital, but practical sources of such cooling streams are not available today.

Available cooling means include either huge and complex electrical refrigeration systems, or simple cooling boxes based on supplied traditional coolants like ice or dry ice. The former means are bulky and expensive, depending on high power input and complex service, while the latter means are unreliable and difficult to store for future use, lacking abilities of affecting the performance parameters. It is therefore an object of the invention to provide a system which avoids drawbacks of the known systems, for cooling relatively small volumes or for providing relatively slight streams of cooled fluid.

It is another object of this invention to provide an autonomous method and device for cooling relatively small volumes and surfaces without external power or coolant supply.

It is a further object of this invention to provide a compact cooling device for medical uses, including for autonomous field-uses without external power or coolant supply.

It is still another object of this invention to provide a closed, compact, and self-sustained refrigeration system for cooling relatively small volumes or areas, or for producing relatively small streams of cooled fluid.

This invention aims at providing a compact and robust cooling device for medical uses, including for autonomous field-uses without external power or coolant supply.

This invention also aims at providing a method for cooling biological samples, tissues, and organs, autonomously and without external power supply.

This invention aims also at providing a method for cooling the brain tissues, and organs, in very rapid and efficient way, autonomously and without external power and coolant supply.

This invention further aims at providing a method for supplying a stream of cool fluid and for cooling a small volume or surface to a desired temperature, immediately when needed.

It is also an object of this invention to provide a simple autonomous system for supplying a stream of cool fluid and for cooling small volumes or surfaces to a desired temperature.

It is further an object of this invention to provide an autonomous device, stable on prolonged storage, supplying a fluid stream of a predetermined temperature below zero centigrade, autonomously and without external power supply, immediately when needed.

Other objects and advantages of the present invention will appear as the description proceeds.

SUMMARY OF THE INVENTION

The invention relates to an autonomous cooling device providing a stream of cool fluid, without a compressor and without an external power supply, employing liquid carbon dioxide (CO2) as a coolant. The device comprises i) a pressurized chamber for containing liquid CO2; ii) an expansion chamber for accepting an amount of liquid CO2 from said pressurized chamber; iii) a first valve for releasing an amount of CO2 from said pressurized chamber to said expansion chamber; iv) a heat exchanger chamber in heat conductive contact with said containing and expansion chamber, for accepting a fluid [Either gas or liquid] to be cooled, provided with a first inlet and an first outlet; v) a first pump for pumping said fluid through said heat exchange chamber; vi) a first temperature sensor measuring the temperature of said fluid at said first outlet; vii) a first flowrate sensor measuring the flowrate of said fluid at said first outlet; viii) a CO2 absorption unit containing a material for absorbing gaseous CO2 and being in gaseous contact with said expansion chamber; ix) a microprocessor unit comprising stored data and suitable software, receiving information signals at least from said sensors and sending instruction signals at least to said releasing valve and to said first pump, and receiving instructions from the operation board; x) a battery for supplying energy to at least said valve, pumps, sensors, and microprocessor; xi) a heat-insulating outer coat for containing the above device elements; xii) an operation board for regulating the temperature and the flowrate at said first outlet; and xiii) a switch for manually starting the cooling activity of the device by initiating said releasing valve and said pump; wherein said amount of liquid CO2 expands and forms solid CO2 and gas CO2, said solid CO2 subliming and further cooling said heat exchanger and said fluid, while said CO2 absorption unit absorbs a part of said gaseous CO2, while said first releasing valve is managed by said microprocessor and repeatedly releases amounts of liquid CO2 in order to keep the temperature and the flowrate at said first outlet at predetermined values.

In one aspect of the invention, said cooled fluid in the device is a liquid circulating in a closed circuit, while cooling, when flowing from said outlet to said inlet, a medical instrument or a cool box containing biological and medical items.

In other aspect of the invention, said cooled fluid in the device is gas, air-to-breath, being driven through said inlet, rid of humidity by a humidity absorption unit located between said inlet and said heat exchanging chamber, and pushed out of said outlet while cooling biological and medical items. In a preferred embodiment of the invention, the cooled fluid is air-to-breath and the device further comprises xiv) a second pump; xv) a mixing chamber provided with a second inlet, a third inlet, and a second outlet, the second inlet receiving a first stream of cold air from said heat exchanger chamber via said first outlet (said second inlet may be identical with said first outlet), the first stream being driven by said first pump, the third inlet receiving a second stream of ambient, warmer air-to-breath, driven by said second pump, and said second outlet releasing a third stream of mixed cold air for desired cooling activity (in fact the stream of cool fluid provided by the invention without a compressor and without an external power supply), wherein said warmer air-to-breath either comes separately from outside or it comes from said first inlet if said inlet is split and supplies both said first and said second stream; xvi) one or two humidity absorption units containing a hygroscopic material for absorbing humidity from said air and drying it before its entrance to said heat exchanging chamber and to said mixing chamber; if said first inlet is split, one unit can dry both streams before they are split; if said first inlet is not split, two units dry independently each one of the streams; xvii) a second temperature sensor measuring the temperature of said fluid at said second outlet; xviii) optionally a third temperature sensor measuring the temperature of said fluid at said first inlet; xix) a second flowrate sensor measuring the flowrate of said fluid at said second outlet; and optionally xx) a second valve for releasing gaseous CO2 from said expansion chamber if the pressure exceeds a predetermined value; wherein said microprocessor unit receives information signals from all sensors and sends instruction signals to said valve and said pumps, thereby ensuring a suitable ratio between said first and said second flow rates, and thus the desired temperature and flowrate at the second outlet. The device of the invention provides a stream of cooled fluid having a temperature of between −75° C. and +5° C., for example between −75° C. and 0° C. Said predetermined flowrate at said second outlet may be between 0.1 and 100 l/min.

The device of the invention is compact, robust, easily scalable, and autonomously working cooling device, efficient for medical applications in hospitals, clinics and home use, as well as applications under complex field conditions and emergency and rescue situations. The device is suitable for medical and research applications at any site, as it does without external power or coolant supply. The autonomous cooling device of the invention is stable on prolonged storage, and can be used any time when needed, immediately supplying a fluid stream of a predetermined, precisely controlled temperature below zero centigrade. The device advantageously cools biological items selected from sample, tissue, organ, or body, to a temperature of down to −75° C., for example human brain tissues to medically acceptable and advantageously lowered temperatures. The device can provide an air stream having a predetermined temperature of between −70° C. and 0° C. and a magnitude of up to 100 l/min. The heat exchanger of the device is made of a heat conductive material and may be filled with a heat conductive mesh made of a fine wire.

The device according to the invention may comprise replaceable and/or disposable parts. In a preferred embodiment, the invention provides a cost-effective, autonomous cooling device for medical uses—which is a disposable apparatus; moreover, the device may be a compact and light apparatus having a volume of merely between 0.1 to 10 liter.

The invention relates to a method for providing a stream of cool fluid and for cooling a small volume or surface to a precisely regulated low temperature immediately when needed, without employing a closed refrigeration cycle or using a compressor, and without external power supply, comprising i) providing at least three chambers, one with an amount of liquid CO2, expanding said liquid CO2 to a second chamber via a micro valve, and driving by a blower said fluid to be cooled through said third chamber with an outlet; ii) measuring by a sensor the temperature of said fluid at said outlet; providing a microprocessor with data and software, receiving signals at least from said sensor and sending instructions at least to said valve and said blower; iii) thereby providing a fluid for cooling medical instruments or a biological items selected from sample, tissue, organ, or body, wherein the cooling may be performed once during an interrupted event or more times during several separate independent events, comprising starting and ending the cooling activity at different times or sites according to the need, while lowering the temperature of said item from ambient temperature by 20-90° C., and the stream of said fluid when being air, may have a magnitude of between 0.1-100 l/min.

The invention provides a refrigeration system for clinical and medical uses, doing without a closed refrigeration cycle and working without external power supply, comprising i) at least three chambers enclosed in a heat insulated coat, a first chamber for containing liquid CO2, a second chamber for expanding said liquid CO2 and forming solid CO2, a third chamber for heat exchange and cooling a fluid to be cooled and to cool a medical instrument or a biological item selected from sample, tissue, organ, or body; ii) two absorption units: one absorbing humidity from said ambient air, and one absorbing gaseous CO2 from said second chamber; iii) at least one blower for driving said fluid through said third chamber; iv) a valve for controlled release of said liquid CO2 to said second chamber; v) at least one temperature sensor for measuring at least the temperature of the cooled fluid; vi) a microprocessor unit comprising stored data and software, receiving information signals at least from said sensor and sending instruction signals at least to said valve and blower; and vii) a battery.

The refrigeration system of the invention preferably cools air-to-breath and comprises i) four chambers: a first chamber for containing liquid CO2, a second chamber for expanding said liquid CO2 and converting it to cold solid, a third chamber for heat exchange and cooling air flowing through it, a fourth chamber for mixing said cold air with ambient warmer air to attain a desired temperature; ii) two absorption units: one absorbing humidity from said ambient air-to-breath, and one absorbing gaseous CO2 from said expansion chamber; iii) two blowers: a first one for driving air through said third chamber, and a second one for driving air through said forth chamber; iv) at least one valve, at least for controlled release of said liquid CO2 to said second chamber; v) temperature sensors for measuring the temperatures and flowrates of air driven from said third chamber, air driven to said fourth chamber, and air driven out of said fourth chamber; vi) a microprocessor unit comprising stored data and software, receiving information signals at least from said sensors and sending instruction signals at least to said valve and blowers; and vii) a battery.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

Figure 1:
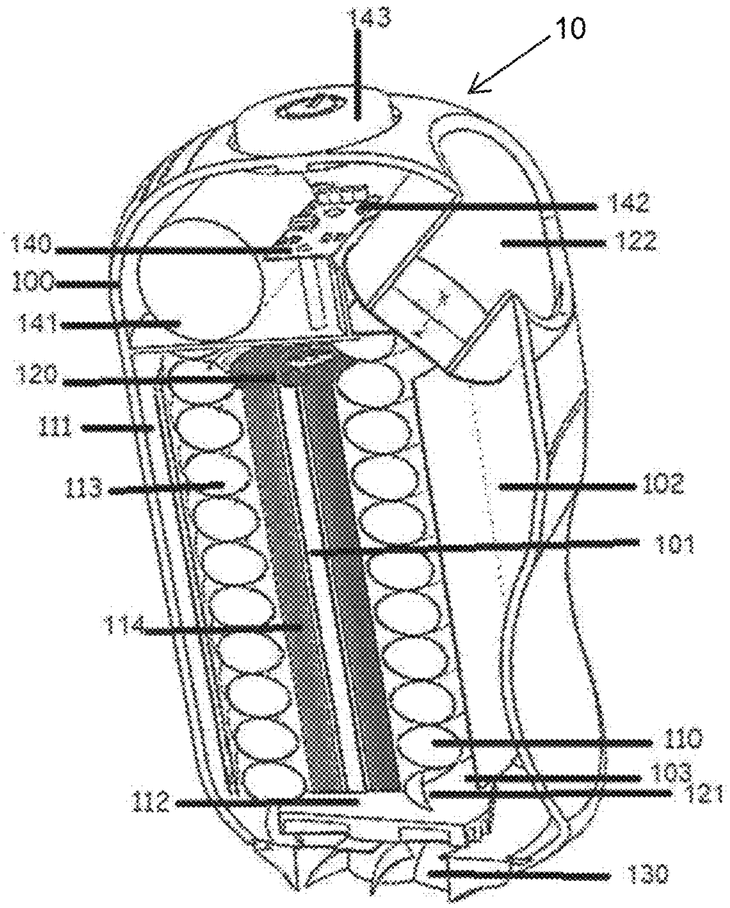
FIG. 1 is a schematic view of the refrigeration device in accordance with one preferred embodiment of the invention.

It has been found that a miniature container of liquid carbon dioxide can supply enough coolant in a compact device for autonomous and controllable cooling of biological items even under field conditions.

The existing cooling systems either include a complex equipment employing the refrigeration cycle (called also heat pump cycle) or they include simple cooling boxes. The former systems use a working coolant which changes temperature and also its phase from a condensed phase to gas and back during one closed refrigeration cycle, wherein the cycle periodically repeats itself, requiring a continual external power input. The latter systems, using a static coolant precooled to a constant low temperature, are unreliable and difficult to control and to plan, and they cannot be stored for future applications without external power output. The invention provides a system which can work autonomously without external power or coolant supply, while being compact, robust, easily scalable, well regulated, easily stored for any future use, and flexibly and precisely managed for medical needs even under the most complex field conditions. In contrast to the existing systems, the invention employs phase transitions without a closed refrigeration (heat pump) cycle.

To provide a refrigeration/freezing system for various clinical and medical uses, this invention employs liquid carbon dioxide (CO2) in a refrigerating low-cost device which is compact and simple in structure, exhibiting a smaller size and having less components than known cooling devices, resulting in fast and controllable performance, enabling easy operation and avoiding difficult maintenance, and importantly capable of providing a predetermined temperature.

The structure of the device according to the invention enables scaling down and scaling up to all practically needed outputs. On the lower side of the device volume, volumes of down to 100 ml and up to 1000 ml can be manufactured according to the invention, such as devices having total outer volumes of 800 ml or less, for example 600 ml, such as 500 ml or 400 ml or 300 ml or 200 ml or 100 ml. The method does enable mini-cooling, and the device may be employed as a mini-freezing machine when needed. On the upper side of the device volume, volumes above 1000 ml can be manufactured according to the invention, such as devices having total outer volumes of 1200 ml or more, for example 1500 ml, such as 2000 ml or 4000 ml or more. In many embodiments of the invention, liquid CO2 takes between 2% and 25% of the device volume, such as between 3% and 20% or between 4% and 15%, for example about 10%. In one embodiment, the invention provides a cooling device of a volume of up to 10 liter, such as up to 5 liter, for example up to 3 liter or up to 2 liter or up to 1 liter, ready to work after unlimited storage, and to be used whenever needed, autonomously and without external power supply.

The controllable device according to the invention can provide coolant fluid, either gas or liquid, for direct use or for further heat transfer from cooled objects. The cool fluid may have a temperature down to −75° C., cooling a biological item such as sample, tissue, or organ. The device of the invention provides, in one embodiment, an air stream having a predetermined temperature of up to +5° C., such as up to 0° C. or up to −10° C. or up to −20° C. or up to −30° C. or up to −40° C. or up to −50° C. or up to −60° C. or up to −70° C. The device of the invention provides, in one embodiment, an air stream having a predetermined temperature of between −70° C. and 0° C. and a magnitude of up to 100 l/min; the magnitude of the cooled air stream may be for example between 1 l/min and 100 l/min, such as between 2 l/min and 20 l/min.

The CO2 refrigerating device of the invention supplies cold fluid in a very short time after being activated (less than a minute, for example less than 30 seconds) to the outlets that can be connected for any refrigeration or freezing needs. For example, cold air may cool a sample or an organ or other biological entity; in other embodiment, cold solvent may cool a storage box to a mildly cold temperature such as 0° C. or a metal tip to a freezing temperature such as below −30° C., for example −40° C. or less, −50° C. or less, −60° C. or less.

The invention relates to a method of autonomous refrigeration, doing without a closed heat pump cycle and without a compressor, providing cool fluid for cooling relatively small volumes and items, particularly in medical practice or research. The method and the device of the invention will be advantageously used in i) perioperative care, such as in operating rooms, recovery rooms, or preoperative case units; ii) acute care, such as in intensive care units, emergency rooms, coronary care units, neurological care units, or burn centers; iii) newborn care, such as in delivery suites, neonatal intensive care units, or postnatal wards; iv) medical/surgical units; v) physiotherapy; vi) military applications; vii) patient and organ transport; viii) chemotherapy; and ix) transport of deceased persons.

The simple and versatile system of the invention provides safe and effective localized cooling therapy, optionally combined with warming followed by cooling therapy or warming therapy, with precise temperature control. Examples of medical situations in which the device according to the invention is advantageously used include chronic pain in orthopedic conditions and skin trauma; insomnia, for example, may be handled by cooling the brain during the sleep hours, providing an easy, natural and effective treatment; focal brain-cooling may ease epileptic seizers. Temperature reduction of a patient's brain is of an extreme importance in case of brain trauma, including stroke, cardiologic episode, head wound, or other brain trauma; the quicker the brain is cooled after the traumatic event, the lower the damages. The invention can have an indispensable role in the brain trauma treatment, in view of the simple and compact character of the device and its autonomous performance, without need of special or specific training or knowledge or professional personnel. The system of the invention comprises a compact cooling device providing a stream of cold air, which may be blown to the breathing openings of the patient directly or, preferably, via a simple plastic flexible facial mask possibly added in a field kit consisting of the device, mask, and directions for use; the mask distributes the cool air flow to the nostrils and/or mouth of the patient.

The kit of the invention may advantageously be easily carried by persons providing first aid, or persons in danger, such as soldiers in action and athlete or sportsman in action that are in danger of head injury or heat trauma.

In another aspect, the system of the invention provides deep-cooled air for cooling the brain for local treatments.

For example, neonatal therapeutic hypothermia is a relatively new treatment option in which an infant's total body temperature is reduced shortly after birth in order to reduce the chances of severe brain damage and to slow down disease progression.

In another aspect, the system of the invention provides deep-cooled air for cooling treatment elements for local treatments. For example, studies find that cryotherapy is useful for preventing symptoms of neuropathy, such as in cases of chemotherapy-treated patients who advantageously wear frozen gloves and socks for 90-minute periods.

In another aspect, the system of the invention provides deep-cooled air for cooling the brain for local treatments. In one example, it is known that stress may be associated with a vast array of negative outcomes for both physical and mental health; based on evidence that stress influences temperature and that psychology and physiology influence each other, there are treatments that reduce stress by reducing brain temperature. In another example, brain cooling may be associated with preventing neurodegeneration, for example in case of neurodegenerative diseases such as Alzheimer's. Other examples of cooling the brain for local treatments may include cryotherapy employed as a non-pharmacological pain-relieving method, especially for intranasal cooling as an effective intervention in an acute migraine attack. Another use of deep-cooled air for cooling the brain for local treatments may comprise insomniacs and people with other sleep disorders who are unable to fall asleep, partly due to being too warm, since temperature is very important for sleep and for falling asleep quickly. Further uses of deep-cooled air for cooling the brain for local treatments may include surgery for brain aneurysms, as there is evidence about the effect of cooling during the open-skull surgery which prevents death or severe disability.

In another aspect, the system of the invention provides deep-cooled liquid for cooling a probe for local treatments. For example, the method of cryoablation can scar a tissue in a vein via a cryoballoon cooled to −40° C. or −50° C., the system of the invention will advantageously be employed. Cryoprobes are frequently needed in cryosurgery, when freeze-cooled thin pen-like metal surface contact tissue to be affected; the cryoprobe can advantageously be cooled by liquid provided by the device of the invention; many topical cryo-treatments are needed in handling dermatologic conditions, and also in cosmetics and aesthetics, for example for freezing fat cells or pigment cells.

The system, the device, and the method of the invention provide invaluable possibilities for medical and biological procedures including relatively small volumes and areas, because the system is independent on outer sources, it is precisely controllable, cost-effective, easy to transport, to be easily operated and planned. The mini device and the simple method of the invention will provide cooled air for breathing, cold fluid for traumatic events, for operation rooms, for anesthesiology, in needs to reduce psychological stress, in alternative treatments of migraines and psychiatric conditions, and others.

Practically, the system of the invention provides cool fluids for freezing or killing cells, for disinfecting samples or instruments, and for many procedures employing lowered temperature. The invention thus enables to flexibly cool or freeze samples from mini samples to relatively large bodies; small instruments including tips and probes; vessels, boxes, sacks and other containers for storing and transporting from small samples to human bodies.

The device of the invention employs a refrigeration cycle in which a part of CO2, liquified at pressures higher than about 5.1 atm and stably included in a storage space of the device, is controllably released to an expanding space of the device, thereby being converted to a mixture of solid (dry ice) and gaseous CO2 having a temperature of around −78° C., wherein the solid undergoes sublimation, thereby further cooling (while absorbing latent heat of sublimation) the walls of the expanding space and the storage space which are in contact with a heat exchanger, through which a fluid to be cooled flows and is cooled. The cooled fluid is directly used or is employed for further heat transfer from another cooled medium or from an item to be cooled. The heat exchanger is made of a heat conductive material and it comprises fine structures to increase the heat-exchanging surface; the structures possibly comprise a mesh made of a fine wire, crumpled and compressed into the volume of said heat exchanger, enabling good heat flow out of the exchanger and good fluid flow through the exchanger. The mesh may comprise wire or fibers of copper, aluminum, or graphite or graphene, for example copper wires 0.05-0.1 mm in thickness, arranged in a mesh having openings of, for example, 1-40 mesh (1-40 openings per inch). The whole volume of the mesh is conductively connected with the outer surface of the heat exchanger, which is cooled by the carbon dioxide; the cooling carbon dioxide may be in direct contact with the outer surface of the heat exchanger or it may be enclosed within conductive envelope surrounding said expansion space. The fine mesh or net is preferably formed from thin and flexible conductive materials, serving as a generator of turbulence and as a heat exchanger as well.

A cooling device (10) according to one embodiment of the invention may look as is shown in FIG. 1. The device (10) may comprise a well isolated body (100), a refrigeration chamber (101) constituting a heat exchanger, said chamber preferably comprising a fine conductive net/mesh (114), in one embodiment in its whole volume, possibly in the form of a cylindrical roll, an ambient air-to-breath flow chamber (102), a liquid CO2 container (110), possibly replaceable and possibly having a spiral shape, a possibly replaceable gaseous-CO2 absorbent unit (111), a possibly replaceable hygroscopic substance unit (112), a receiving spiral pipe (113) constituting the expanding space, an electromechanical micro valve (120), a discharge valve in the end of the spiral pipe (121), a single or double outlet (122), a single or double fluid (air/gas or liquid) pump (130), an operational switch and operation electronic board (140), a possibly rechargeable battery (141), a bypass pipe for fluid (103), a replaceable CO2 gas absorbent replaceable container (104), a temperature sensor (142), and an activating/operational button/switch (143). The operational switch activates a micro valve to release an amount of the liquid CO2 to start the sublimation reaction, said released amount being very flexible and finely controlled, in accordance with the desired amount of the cool fluid, such as cool air in said outlet. Said battery enables the operation of mini valves, mini motors/pumps/blowers, and sensors. The device (10) can be connected to varies medical devices as a cooling/freezing unit.

The invention provides additional arrangements; for example, said liquid CO2 may be stored in an essentially cylindrical container inside said body 100, having for example a volume of 1⁄20 or 1⁄10 of the total device volume, whereas a regulated valve releases a part of the compressed CO2 into said expansion space. Said expansion space surrounding said heat exchanger, for example in the form of a spiral tubing closely adjacent onto said exchanger. Gaseous CO2 which lost a great part of its cool may be removed from the expansion space, preferably by absorbing in said absorption unit.

Figure 2:
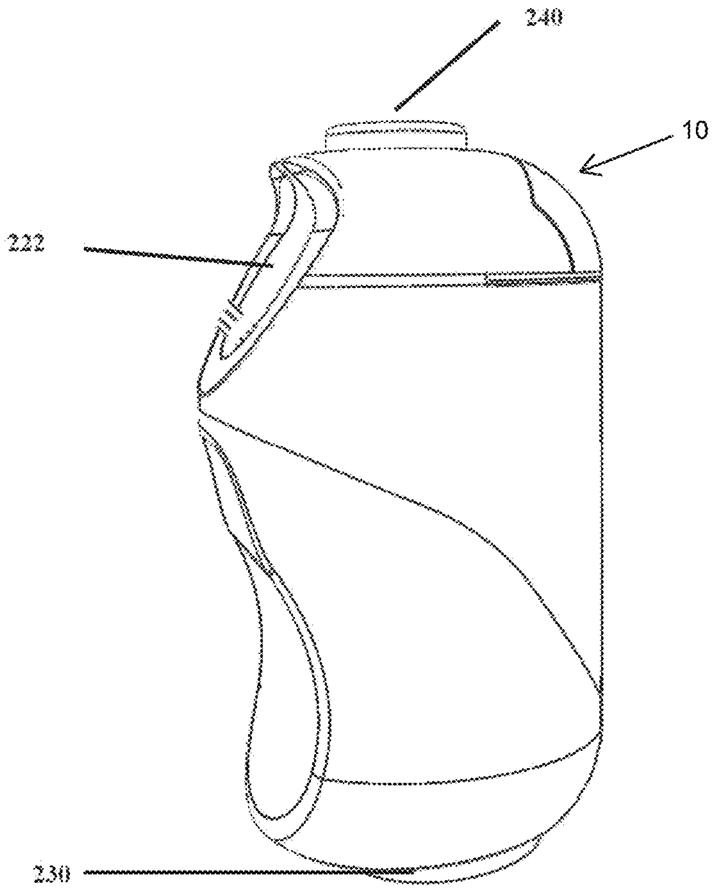
FIG. 2 is a compact device in one embodiment of the invention.

A cooling device (10), in accordance with one embodiment of the invention having a total volume of between 200 and 400 $cm^3$, may have a general appearance as shown in FIG. 2. The device (10) may have a shape comfortably graspable by one hand of an adult person; it can be simply activated by pushing an activating button (240) by one finger, which relatively quickly starts sucking outer air into an inlet (230) and releasing a cool air stream from an outlet (222). In a preferred embodiment, a part of the ambient air-to-breath (relatively warm air) drawn into the device (10) via said inlet is precooled in the heat exchanger to a temperature lower than is a needed for a predetermined temperature for the external use, and a part of the ambient air is mixed with said precooled air in a ratio providing said predetermined temperature in the cool air exhausted in said outlet, wherein the stream magnitudes and the mixing ratio are regulated by a system comprising blower(s), valves, processor, and suitable software including predetermined desired process parameters. Said inlet 230 may be a single inlet, or a double inlet for drawing two air streams into the device (10). Element 230 in FIG. 2 may represent one inlet or two separate inlets. Said outlet 222 may comprise connectors to connect said outlet with a tubing, a facial mask, a liquid system, a medical device, and other needed apparatuses or instruments.

A refrigeration device according to the invention usually consists of four main spaces (chambers), two absorption units, valves and sensors, two blowers, regulation elements, and insulating outer coat. Said chambers include CO2 liquid container, expansion space, heat exchanger space, and mixing space; said absorption units include CO2 gas absorbing unit and humidity absorbing unit; said valves are finely regulated and include liquid CO2 release valve, safety pressure valve, and fluid stream regulating valves. The cooling device of the invention may be designed to comprise replaceable parts, including humidity absorption unit, CO2 gas absorption unit, liquid CO2 container, or battery.

Figure 3:
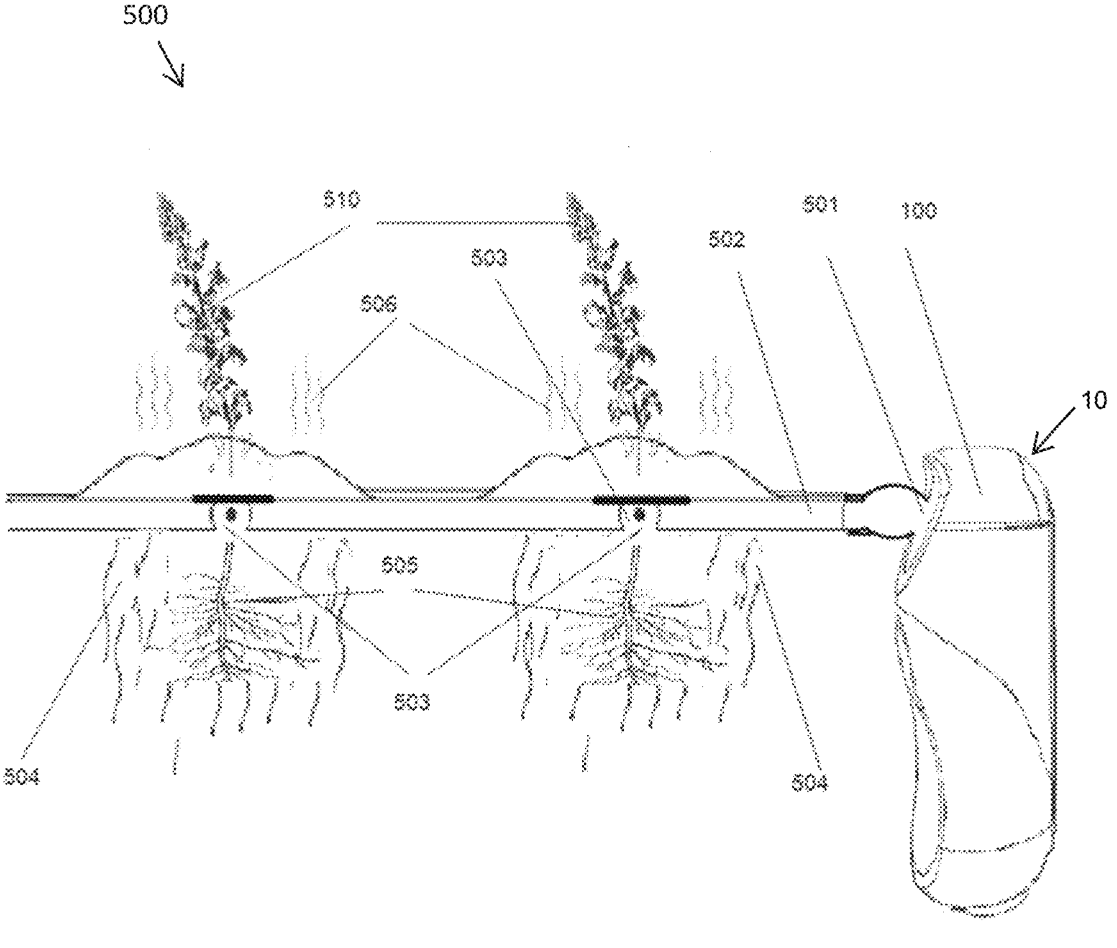
FIG. 3 schematically illustrates a refrigeration device in the farming Vernalization embodiment of the invention.

FIG. 3 schematically illustrates an implementation of a farming Vernalization system (500), according to an embodiment of the invention. According to the farming Vernalization embodiment of the invention, a cooling device (10) may look as is shown in FIG. 3. The system (500) may comprise a well isolated device body (100), an interface into the irrigation pipes system (501) constituting an irrigation pipes as a heat exchanger with the farming soil (502), said pipes preferably comprising a fine Low flow outlets (503), in one embodiment in its whole length, the pipes, possibly in the underground deployment. The cold air is exchanging cooling energy with the farming medium (504) and released into the root system (505) of the plants (510). The invention provides additional arrangements; for example, said the gaseous CO2 (506) may be in reach the atmosphere for the farming plants for more efficient photosynthesis process in the green plant's organs (510). Additionally, the air humidity that are getting frozen in the cooling device (10) are defrizzed in the proses and released into the irrigation system and providing part of the farming essential water supply of the plants.

In one embodiment, the invention provides a method for manufacturing a disposable cooling device. In a preferred embodiment, the invention relates to a disposable cooling device for autonomous field work. Said field work may comprise one uninterrupted cooling activity or event; said work may comprise an activity or event comprising interrupted cooling; said work may comprise several independent events comprising starting and ending the cooling activity at different times or sites according to the need.

Said discharge valve provides a protection against high gas pressure in the pipe. Said fluid (air or gas or liquid) pumps may comprise any pump or fan or blower enabling the flow/circulation of the fluid stream inside or through the device. Said CO2 absorbent unit contains a substance absorbing CO2 gas, an example being an oxide or hydroxide of alkali metal or alkali earth metal. Said humidity absorbent unit containing hygroscopic substance enabling removal of the humidity from the air stream. Said operational switch may comprise any mechanical or electromechanical switch means. Said liquid CO2 container preferably comprises a valve for releasing said compressed liquid CO2 into a lower pressure in said expanding space in atmospheric pressure. In a preferred embodiment of the invention, the device has a capacity to cool a fluid stream, for example to cool an air stream from ambient temperature of 15 to 30° C. down to a temperature of between −40° C. and −10° C. In other preferred embodiment of the invention, the device has a capacity to cool a fluid stream, for example to cool an air stream and lower its temperature by 20-90° C. Said fluid stream may comprise, for example, a liquid solvent or air. In some embodiments, the cool air stream may have a magnitude of between 0.1-100 l/min, such as 1-50 l/min, for example 2-20 l/min or 3-15 l/min or 4-12 l/min or 5-10 l/min.

In some embodiments, the device of the invention may comprise elements such as a controlled release valve to avoid high CO2 pressures in the device expanding space; fine mesh network in the heat exchanger; a single or double outlet for the cooled substance; a hygroscopic substance unit containing a hygroscopic substance such as phosphorus pentoxide, calcium chloride, or other materials selected from oxides, hydroxides and acids; a releasing valve for releasing an amount of high pressure CO2 liquid to the expanding space, finally controlled via a microprocessor and suitable software.

The device according to the invention is advantageous for being simple, self-sufficient, small, light, and inexpensive; it can be safely controlled, operated and adjusted, with the support of available sensors, and via Wearable Technology and/or by Smartphone, in medical and research fields.

Importantly, the invention provides a novel cooling device for emergency and rescue situations, which is surprisingly compact, robust, easily scalable to any needed size, and working autonomously without external power supply or coolant supply; the device can be efficiently employed in medical applications, even under the most complex field conditions.

Thus, a refrigeration system is now provided, doing without a closed heat pump cycle, and without a compressor.

While the invention has been described using some specific examples, many modifications and variations are possible. It is therefore understood that the invention is not intended to be limited in any way, other than by the scope of the appended claims.

The invention claimed is:

1. An autonomous cooling device providing a stream of cool fluid, without a compressor and without an external power supply, employing liquid carbon dioxide (CO2) as a coolant, comprising:

a) a pressurized chamber for containing liquid CO2;

b) an expansion chamber for accepting an amount of liquid CO2 from said pressurized chamber;

c) a first valve for releasing an amount of CO2 from said pressurized chamber to said expansion chamber;

d) a heat exchanger chamber in heat conductive contact with said pressurized and expansion chamber, for accepting a fluid to be cooled, provided with a first inlet and a first outlet;

e) a first pump for pumping said fluid through said heat exchanger chamber;

f) a first temperature sensor measuring the temperature of said fluid at said first outlet;

g) a first flowrate sensor measuring the flowrate of said fluid at said first outlet;

h) a CO2 absorption unit containing a material for absorbing gaseous CO2 and being in gaseous contact with said expansion chamber;

i) a microprocessor unit comprising stored data and suitable software, receiving information signals at least from said sensors and sending instruction signals at least to said first valve and to said first pump, and receiving instructions from the operation board;

j) a battery for supplying energy to at least said first valve, pumps, sensors, and microprocessor;

k) a heat-insulating outer coat for containing the above device elements;

l) an operation board for regulating the temperature and the flowrate at said first outlet; and m) a switch for manually starting the cooling activity of the device by initiating said first valve and said pump;

wherein said amount of liquid CO2 expands and forms solid CO2 and gas CO2, said solid CO2 subliming and further cooling said heat exchanger and said fluid, while said CO2 absorption unit absorbs a part of said gaseous CO2, while said first valve is managed by said microprocessor and repeatedly releases amounts of liquid CO2 in order to keep the temperature and the flowrate at said first outlet at predetermined values.

2. The device of claim 1, wherein said fluid is a liquid circulating in a closed circuit, while cooling, when flowing from said outlet to said inlet, a medical instrument or a cool box containing biological and medical items.

3. The device of claim 1, wherein said fluid is a gas being driven through said inlet, rid of humidity by a humidity absorption unit located between said inlet and said heat exchanging chamber, and pushed out of said outlet while cooling biological and medical items, optionally after dilution with warmer dry air.

4. The device of claim 1 wherein said fluid is air, further comprising a) a second pump;

b) a mixing chamber provided with a second inlet, a third inlet, and a second outlet, the second inlet receiving a first stream of cold air from said heat exchanger chamber via said first outlet driven by said first pump, the third inlet receiving a second stream of ambient, warmer air, driven by said second pump, and said second outlet releasing a third stream of mixed cold air for desired cooling activity, wherein said warmer air-to-breath either comes separately from outside or said warmer air-to-breath comes from said first inlet if said inlet is split and supplies both said first and said second stream;

c) one or two humidity absorption units containing a hygroscopic material for absorbing humidity from said air and drying said air before said air entering to said heat exchanger chamber and to said mixing chamber; if said first inlet is split, one unit can dry both streams before they are split; if said first inlet is not split, two units dry independently each one of the streams;

d) a second temperature sensor measuring the temperature of said fluid at said second outlet;

e) optionally a third temperature sensor measuring the temperature of said fluid at said first outlet;

f) optionally a second flowrate sensor measuring the flowrate of said fluid at said second outlet; and optionally g) a second valve for releasing gaseous CO2 from said expansion chamber if the pressure exceeds a predetermined value;

wherein said microprocessor unit receives information signals from all sensors and sends instruction signals to said valves and said pumps, thereby ensuring a suitable ratio between said first and said second flow rates, and thus a desired temperature and flowrate at the second outlet.

5. The device of claim 1, wherein said cooled fluid has a temperature of between −75° C. and 0° C.

6. The device of claim 3, wherein said predetermined flowrate at said second outlet is between 0.1 and 100 l/min.

7. The device of claim 3, being autonomously working cooling device, efficient for medical applications in hospitals, clinics, at home, as well as under the complex field conditions and emergency and rescue situations.

8. The device of claim 3, for medical and research applications without external power or coolant supply.

9. The autonomous cooling device of claim 3, supplying a fluid stream of a predetermined controlled temperature below zero centigrade.

10. The device of claim 3 for cooling a biological item selected from sample, tissue, organ, or body, to a temperature of down to −75° C.

11. The device of claim 3, providing an air-to-breath stream having a predetermined temperature of between −70° C. and +5° C. and a flowrate of up to 100 l/min.

12. The device of claim 3, wherein said heat exchanger chamber is made of a heat conductive material and is filled with a heat conductive mesh made of a fine wire.

13. The device of claim 3, comprising replaceable and/or disposable parts.

14. The autonomous cooling device of claim 1, being a disposable apparatus having a volume of between 0.1 to 1 liter for medical uses.

15. The autonomous cooling device of claim 1 having an isolated device body suitable for implementing a farming Vernalization system.

16. The device of claim 1 adapted for clinical and medical uses, doing without a closed refrigeration cycle and working without external power supply, comprising:

a) at least three chambers enclosed in a heat insulated coat, a first chamber for containing liquid CO2, a second chamber for expanding said liquid CO2 and forming solid CO2, a third chamber for heat exchange and cooling a fluid to be cooled and to cool a medical instrument or a biological item selected from sample, tissue, organ, or body;

b) two absorption units: one absorbing water from said ambient air, and one absorbing gaseous CO2 from said second chamber;

c) at least one blower for driving said fluid through said third chamber;

d) a valve for controlled release of said liquid CO2 to said second chamber;

e) at least one temperature sensor for measuring at least the temperature of the cooled fluid;

f) a microprocessor unit comprising stored data and software, receiving information signals at least from said sensor and sending instruction signals at least to said valve and blower; and g) a battery.

17. The device of claim 16 wherein said fluid is air, comprising:

a) a fourth chamber: said first chamber for containing said liquid $CO_2$, said second chamber for expanding said liquid $CO_2$ and converting it to cold solid $CO_2$, said third chamber for heat exchange and cooling air flowing through said third chamber, said fourth chamber for mixing said cold air with ambient warmer air to attain a desired temperature;

b) two absorption units: one absorbing water from said ambient air, and one absorbing gaseous $CO_2$ from said expansion chamber;

c) two blowers: a first one for driving air through said third chamber, and a second blower for driving air through said forth chamber;

d) at least one micro valve, at least for controlled release of said liquid $CO_2$ to said second chamber;

e) temperature sensors for measuring the temperatures and flowrates of air driven from said third chamber, the air driven to said fourth chamber, and the air driven out of said fourth chamber;

f) a microprocessor unit comprising stored data and software, receiving information signals at least from said sensors and sending instruction signals at least to said micro valve and said first and second blowers; and g) a battery.

18. A method for providing a stream of cool fluid and for cooling a volume or surface to a regulated low temperature, without employing a closed refrigeration cycle or using a compressor, and without external power supply, comprising a) providing at least three chambers, a first chamber with an amount of liquid $CO_2$, expanding said liquid $CO_2$ to a second chamber via a micro valve, and driving by a blower said fluid to be cooled through said third chamber with an outlet;

b) measuring by a sensor the temperature of said fluid at said outlet;

c) providing a microprocessor with data and software, receiving signals at least from said sensor and sending instructions at least to said valve and said blower;

thereby providing the stream of cool fluid for cooling medical instruments or a biological item selected from sample, tissue, organ, or body, wherein the cooling may be performed once during an interrupted event or more times during several separate independent events, comprising starting and ending the cooling activity at different times or sites according to a need, while lowering the temperature of said item from ambient temperature by 20-90° C., and the stream of said fluid when being air, may have a flowrate of between 0.1-100 l/min.

* * * * *